United States Patent
Friday et al.

(10) Patent No.: US 12,088,735 B1
(45) Date of Patent: *Sep. 10, 2024

(54) APPARATUS, SYSTEMS, AND METHODS RELYING ON NON-FLASHABLE CIRCUITRY FOR IMPROVING SECURITY ON PUBLIC OR PRIVATE NETWORKS

(71) Applicant: ZECURITY, LLC, Houston, TX (US)

(72) Inventors: Victor Bryan Friday, Houston, TX (US); David Lee Ronn, Houston, TX (US)

(73) Assignee: ZECURITY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,607

(22) Filed: Apr. 25, 2024

Related U.S. Application Data

(63) Continuation-in-part of application No. 18/367,942, filed on Sep. 13, 2023, now Pat. No. 12,015,719.

(51) Int. Cl.
*H04L 9/40* (2022.01)
*H04L 9/32* (2006.01)

(52) U.S. Cl.
CPC .................. *H04L 9/3247* (2013.01)

(58) Field of Classification Search
CPC ....................................... H04L 9/3247
See application file for complete search history.

(56) References Cited

U.S. PATENT DOCUMENTS

| | | | |
|---|---|---|---|
| 6,438,130 B1 | 8/2002 | Kagan | |
| 6,453,353 B1 | 9/2002 | Win | |
| 6,631,453 B1 | 10/2003 | Friday | |
| 6,763,015 B1 | 7/2004 | Phillips | |
| 6,894,972 B1* | 5/2005 | Phaal | H04L 43/065 370/235 |
| 7,426,599 B2 | 9/2008 | Yancey | |
| 7,808,995 B2* | 10/2010 | Kuo | H04L 69/22 370/392 |
| 9,848,005 B2 | 12/2017 | Ardeli | |
| 2001/0049616 A1* | 12/2001 | Khuzadi | G06Q 10/06 705/39 |
| 2002/0038253 A1* | 3/2002 | Seaman | G06Q 30/02 705/26.1 |

(Continued)

FOREIGN PATENT DOCUMENTS

| | | |
|---|---|---|
| CN | 103838670 A | 6/2014 |
| GB | 2441909 A | 3/2008 |

(Continued)

*Primary Examiner* — Ghodrat Jamshidi
(74) *Attorney, Agent, or Firm* — Jonathan Pierce; Pierre Campanac; Porter Hedges LLP

(57) ABSTRACT

A hardware unit relies on non-flashable circuitry for improving security on a public or private network. The hardware unit can be added to a network without substantial modifications to the other devices already connected to the network. The hardware unit detects and blocks or drops data packets or frames that contain an instruction of a known file-sharing protocol other than a reading instruction that are not digitally signed by a recognized source. Thus, a cyber attack may be prevented instantaneously by what it attempts to do, typically the creation, insertion, deletion, update, renaming, or writing of files to compromise code or data.

20 Claims, 2 Drawing Sheets

(56) References Cited

U.S. PATENT DOCUMENTS

| | | | |
|---|---|---|---|
| 2005/0169270 A1* | 8/2005 | Mutou | H04L 12/4641 |
| | | | 370/395.2 |
| 2006/0041889 A1 | 2/2006 | Radulescu | |
| 2006/0253903 A1 | 11/2006 | Krumel | |
| 2008/0132288 A1 | 6/2008 | Misawa | |
| 2008/0137854 A1 | 6/2008 | Friday | |
| 2008/0279166 A1 | 11/2008 | Carty | |
| 2010/0061263 A1 | 3/2010 | Breeding | |
| 2010/0169964 A1 | 7/2010 | Liu | |
| 2010/0174608 A1 | 7/2010 | Harkness | |
| 2012/0182891 A1 | 7/2012 | Lee | |
| 2012/0240185 A1 | 9/2012 | Kapoor | |
| 2013/0275228 A1 | 10/2013 | Milazzo | |
| 2014/0269697 A1 | 9/2014 | Salys | |
| 2014/0328249 A1 | 11/2014 | Vermani | |
| 2016/0239263 A1* | 8/2016 | Park | G06F 5/14 |
| 2016/0365952 A1* | 12/2016 | Kim | H04L 1/1816 |
| 2017/0134541 A1* | 5/2017 | Xu | H04L 47/32 |
| 2019/0313160 A1 | 10/2019 | Stokking | |
| 2020/0004962 A1 | 1/2020 | Araujo et al. | |
| 2020/0250344 A1* | 8/2020 | Rahn | H04L 9/3236 |
| 2020/0319875 A1* | 10/2020 | Parthasarathy | G06F 8/41 |
| 2021/0067534 A1* | 3/2021 | Mi | H04L 45/74 |
| 2021/0152860 A1 | 5/2021 | Patro | |
| 2021/0226899 A1 | 7/2021 | Kanurakaran | |
| 2021/0377029 A1 | 12/2021 | Sloane | |
| 2022/0272039 A1 | 8/2022 | Cardona | |
| 2023/0117644 A1* | 4/2023 | Kamisetty | H04L 49/354 |
| | | | 370/254 |
| 2023/0205715 A1 | 6/2023 | Harris | |
| 2023/0305956 A1* | 9/2023 | Chen | G06F 12/0246 |
| 2024/0022638 A1 | 1/2024 | Wang | |

FOREIGN PATENT DOCUMENTS

| | | |
|---|---|---|
| WO | 2001075595 A2 | 10/2001 |
| WO | 2003067810 A1 | 8/2003 |
| WO | 2004102326 A2 | 11/2004 |
| WO | 2016117302 A1 | 7/2016 |
| WO | 2016159812 A2 | 10/2016 |

* cited by examiner

APPARATUS, SYSTEMS, AND METHODS RELYING ON NON-FLASHABLE CIRCUITRY FOR IMPROVING SECURITY ON PUBLIC OR PRIVATE NETWORKS

CROSS-REFERENCE TO RELATED APPLICATIONS

This application is a continuation-in-part of U.S. application Ser. No. 18/367,942 filed on Sep. 13, 2023.

FIELD OF THE INVENTION

This disclosure relates generally to apparatus, systems, and methods for improving security on a public or private network, such as detecting and/or preventing the unauthorized creation, insertion, deletion, update, or writing of files. This disclosure relates more particularly to apparatus, systems, and methods that rely on non-flashable circuitry, in contrast to software, for screening data packets or frames coming from a public or private network, and thus offer added protection against hackers or other unauthorized users.

BACKGROUND OF THE INVENTION

Security on networks is usually provided by software. However, software can be altered by hackers or other unauthorized users. As such, software, regardless of its level of sophistication, may have an inherent weakness compared to non-flashable circuitry.

An example of a secure data storage device on a private or public network is described in U.S. Pat. No. 6,631,453 issued on Oct. 7, 2003. This patent reference discloses a data storage/transmission hardware device (or multiple devices physically linked together) with two (or more) connectors. One of the connectors allows for the reading and writing of information (referred to as the "active channel") while the other connector(s) (referred to as "passive channels") allow solely for the reading of information. The actual limitation of "write" access of the passive connectors is brought about by a combination of hardware and firmware.

Security threats are often presented by cyber-attacks where a hacker or other unauthorized user creates, inserts, deletes, updates, renames, or writes computer files remotely by sending data packets or frames via a private or public network. The data packets or frames sent by the hacker or other unauthorized user are usually detected by firewall software and discarded. However, firewalls are an incomplete stopgap solution as they are still vulnerable due to their nature as software and unreliable to protect against cyber-attacks as they require constant updating from trained personnel. Even with that updating, they still may not be able to keep up with the flow of new malware. As such, firewall software may not be sufficient.

In view of the foregoing, there is still a need in the art for apparatus, systems, and methods for improving security on a public or private network, such as detecting and/or preventing the unauthorized creation, insertion, deletion, renaming, writing or update of files. Preferably, these apparatus, systems, and methods rely on non-flashable circuitry, in contrast to software, for improving security.

SUMMARY

The disclosure describes an apparatus for providing protection to a device connected to a public or private network. The apparatus comprises an enclosure having at least first, second, and third connections and comprising a motherboard. The apparatus also comprises non-flashable circuitry located in the enclosure and mounted on the motherboard, wherein the non-flashable circuitry is connectable to the public or private network via the first and second connections, and the non-flashable circuitry is connectable to the device via the third connection. As used herein, non-flashable circuitry is such that firmware implemented on non-flashable circuitry cannot be altered or updated from a remote location. The non-flashable circuitry is configured to receive first data packets or frames from the public or private network via the first connection, determine whether the first data packets or frames contain an instruction of a known file-sharing protocol other than a reading instruction, discard the first data packets or frames when the first data packets or frames contain the instruction other than the reading instruction, and transmit the first data packets or frames to the device via the third connection when the first data packets or frames are not discarded. In some cases, the instruction in the first data packets or frames may be altered and data packets or frames with altered functionality may be transmitted to the device, for example, in order to gain additional reporting information, such as file names, file location, directory names, etc., or to stop the ability to download information requested from a reading instruction. The non-flashable circuitry is further configured to receive second data packets or frames via the second connection, determine whether the second data packets or frames are digitally signed and originate from a source identified by a token stored in the non-flashable circuitry, discard the second data packets or frames when the second data packets or frames are not digitally signed or do not originate from the source, and transmit the second data packets or frames to the device via the third connection when the data packets or frames originate from the source.

The disclosure further describes an apparatus for protecting a database from cyber attacks. The apparatus comprises an enclosure having at least a connection and comprising a motherboard, a storage medium that is located in the enclosure and coupled to the motherboard, the storage medium hosting the database, and non-flashable circuitry located in the enclosure and mounted on the motherboard. The non-flashable circuitry is connectable to a public or private network via the connection and wherein the non-flashable circuitry is configured to receive data packets or frames from the public or private network via the connection, determine whether the data packets or frames contain a reading instruction of a known file-sharing protocol and the data packets or frames are addressed to the storage medium, execute the reading instruction when the data packets or frames contain the reading instruction and the data packets or frames are addressed to the storage medium, determine whether the data packets or frames are digitally signed by a source identified by a token stored in the non-flashable circuitry and the data packets or frames are addressed to the storage medium, execute the instructions contained in the data packets or frames when the data packets or frames are digitally signed and the data packets or frames are addressed to the storage medium, determine whether the data packets or frames contain an instruction of the known file-sharing protocol other than the reading instruction, the data packets or frames are not digitally signed by the source, and the data packets or frames are addressed to the storage medium, and discard the data packets or frames when the data packets or frames contain the instruction other than the reading instruction, the data packets or frames are not digitally signed by the source, and the data packets or frames are addressed to the storage medium. In some cases, the instruction in the data packets or frames may be altered, and the altered instruction may be executed, for example, in order to gain additional reporting information, such as file names, file location, directory names, etc., or to stop the ability to download information requested from a reading instruction.

The disclosure further describes a method of providing protection to a device or a database connected to a public or private network against cyber attacks. The method comprises the step of providing an apparatus such as described in this section. The apparatus is used to perform the steps of receiving data packets or frames from the public or private network, either transmitting the data packets or frames when the data packets or frames contain a reading instruction or executing reading instructions contained in the data packets or frames, either transmitting the data packets or frames when the data packets or frames are digitally signed by the source or executing instructions contained in the data packets or frames when the data packets or frames are digitally signed by the source, and discarding the data packets or frames when the data packets or frames are not digitally signed by the source and contain an instruction other than a reading instruction. In some cases, the method may further comprise the step of altering the instruction in the data packets or frames, and either transmitting data packet or frames with modified functionality or executing the altered instruction.

BRIEF DESCRIPTION OF THE DRAWINGS

For a more detailed description of the embodiments of the disclosure, reference will now be made to the accompanying drawings, wherein.

DETAILED DESCRIPTION

This disclosure describes hardware units that rely on non-flashable circuitry (e.g., Application-Specific Integrated Circuits (ASICs), Field-Programmable Gate Arrays (FPGAs), or permanent Read-Only Memory (ROM) chips, or other burnable circuitry) for improving security on a public or private network. These hardware units can be added to a network without substantial modifications to the other devices already connected to the network. Thus, in contrast with current ways of providing protection, which are solely software based, the hardware units are hardware that may be added to the public or private network. These hardware units detect and block or drop data packets or frames that contain an instruction of a known file-sharing protocol other than a reading instruction which are not digitally signed by a recognized source. Examples of known file-sharing protocols include, but are not limited to, the Server Message Block (SMB) protocol, the Network File System (NFS) protocol, the Apple Filing Protocol (AFP), or other protocols that may be developed in the future and are known at the time the apparatus are manufactured and/or in use. Examples of instructions other than a reading instruction include, but are not limited to, instructions to create a file, insert data in a file, delete a file, rename a file, update or write on a file. Thus, a cyber attack or unauthorized access may be detected instantaneously by what it attempts to do, typically the creation, insertion, deletion, update, renaming, or writing of files.

Figure 1:
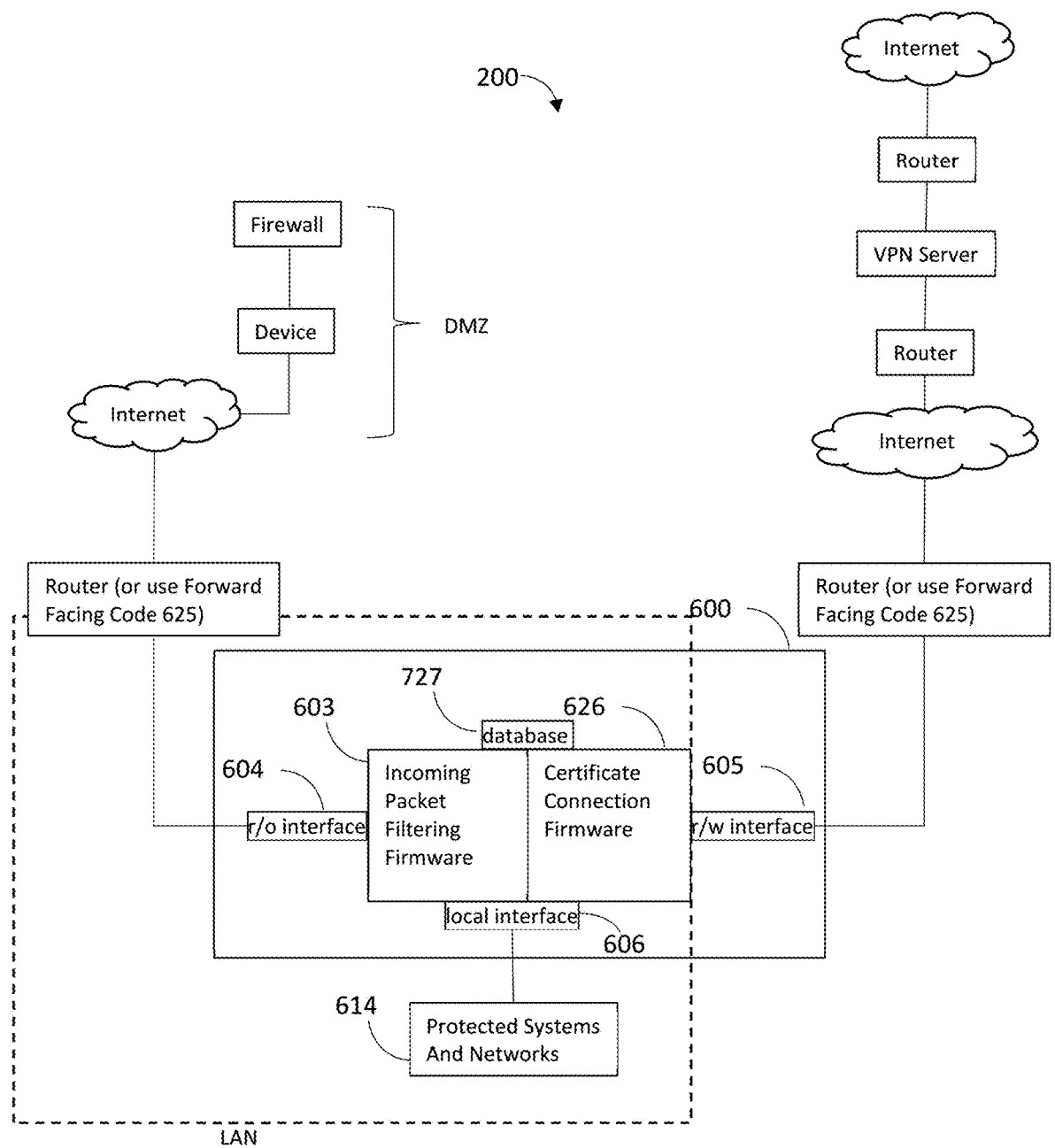
FIG. 1 is a schematic of a system, wherein the system includes a hardware unit relying on non-flashable circuitry for providing protection to a device or a database connected to a public or private network, typically against cyber attacks.

FIG. 1 illustrates a system 200 including a hardware unit 600 that is used for providing protection against cyber attacks without using conventional means or identity algorithms to do so. In some preferred embodiments, the hardware unit 600 may be used to provide protection to computer systems and networks 614. In other preferred embodiments, the hardware unit 600 may be used to provide protection to a customer database portion 727.

For example, computer systems and networks 614 may include a Remote Telemetry Unit ("RTU") of a Supervisory Control and Data Acquisition ("SCADA") system, a data server, or a file server. In the example shown, the computer systems and networks 614 are connected to the Internet (an example of a public network) to share data. In particular, a Programmable Logic Controller ("PLC") located in the demilitarized zone DMZ may be able to retrieve data from the computer systems and networks 614. In these examples, malicious agents may utilize the Internet and/or the Local Area Network ("LAN") to compromise code or data hosted on the computer systems and networks 614. In order to ensure the protection of this code or data, the hardware unit 600 is connected between the Internet and/or the LAN and the computer systems and networks 614. In particular, the hardware unit 600 has two interfaces 604 and 605, each having its own IP address, that are both connected to the Internet and/or the LAN, and a third interface 606, that is connected to the computer systems and networks 614.

In other examples, a customer database portion 727 may include documents or data files, encryption keys, or Bitcoin keys. The customer database portion 727 is brought online on a public or private network to share data. In these examples, malicious agents may utilize the Internet and/or the LAN to compromise code or data stored on the customer database portion 727. In order to ensure the protection of this code or data, the customer database portion 727 is stored on a disk of the hardware unit 600, which is, in turn, connected to the Internet and/or the LAN. Again, the hardware unit 600 has two interfaces 604 and 605, each having its own IP address, that are both connected to the Internet and/or the LAN.

The IP address of the interface 604 is preferably public. The IP address of the interface 605 is preferably kept private, for example, with the utilization of a Virtual Private Network ("VPN") server. The hardware unit 600 contains firmware 603 that detects an attempt to create, insert data in, delete, update, rename, or write a file via an external port interface 604 configured as read-only (r/o). The hardware unit 600 also contains firmware 626 which enables the requirement of a certificate connection code for read-write via an external port interface 605 configured as read-write (r/w). The firmware 603 and 626 are implemented with non-flashable circuitry, whereby the firmware 603 and 626 cannot be updated from a remote location.

Figure 2:
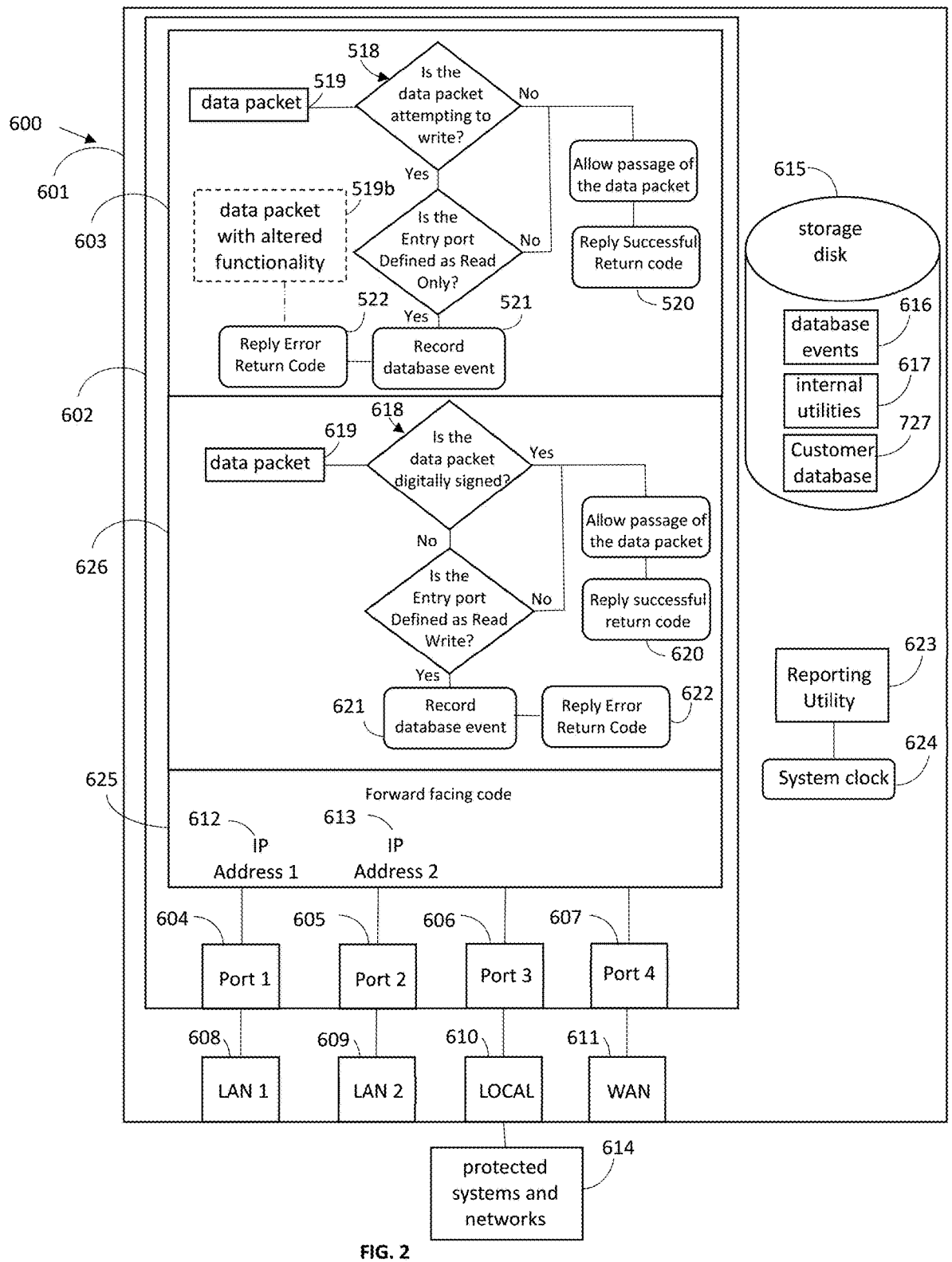
FIG. 2 is a schematic of the hardware unit shown in FIG. 1.

FIG. 2 is a block diagram of a hardware unit 600 which protects other computer systems and networks from cyber attacks without using conventional means or identity algorithms to do so.

The hardware unit 600 includes an enclosure 601. The hardware unit 600 contains a motherboard 602 which controls the operation of the hardware unit 600. The motherboard 602 contains the embedded firmware 603 which uses logic for the hardware unit 600 and controls the behavior of the hardware unit 600 for reading via an external port configured as read-only. The firmware 603 is designated as non-flashable memory where the firmware 603 cannot be updated from a remote location. The motherboard 602 also contains the embedded firmware 626 which enables the requirement of a certificate connection code for reading or writing via an external port configured as read-write. The hardware unit 600 contains a storage disk 615 that is used to capture database events 616 and house internal utilities 617.

The motherboard 602 contains four interfaces or ports: Port1 604, Port2 605, Port3 606 and Port4 607. The hardware unit 600 contains four external wired or wireless connections: LAN1 608, LAN2 609, LOCAL 610, and WAN 611. Port1 604 is connected to LAN1 608. Port2 605 is connected to LAN2 609. Port3 is connected to LOCAL which is externally connected to the protected systems and networks 614 which are being protected from cyber attacks by the hardware unit 600. Port4 607 is connected to WAN 611. LAN1 608 uses IP_Address_1 612. LAN2 609 uses IP_Address_2 613. The hardware unit 600 contains forward facing to internet code 625 which allows connections on LAN1 608 and LAN2 609 directly to the internet/cloud if needed. Upon installation of the hardware unit 600, Port1 604, and Port2 605 can be configured (e.g., their processor chips can be burned) as read-only or read-write.

For the diagram of FIG. 2, the basis for the logic provided will be: Port1 604 will be configured as read-only, and Port2 605 will be configured as read-write; the firmware 603 and 626 contain embedded logic to process a data packet 619; the data packet 619 enters the hardware unit 600 through LAN1 608 and Port1 604 or LAN2 609 and Port2 605 attempting to gain access to the protected systems and networks 614 connected through Port3 606 and LOCAL 610 or to the customer database portion 727.

As illustrated in FIG. 2, in firmware 626, the embedded logic 618 first checks the data packet 619 to determine if the data packet 619 is digitally signed by an authorized entity. For example, the payload of the data packet 619 may be encrypted using a private key, and also includes a control checksum of the unencrypted payload. The encrypted payload is then decrypted using a public key, and the checksum of the payload so decrypted is calculated. The calculation is compared with the control checksum. If the calculation matches the control checksum, then the data packet 619 is deemed digitally signed by an authorized entity. Otherwise, the data packet 619 is not deemed digitally signed by an authorized entity. If the data packet 619 is deemed digitally signed by an authorized entity, then the embedded logic 618 allows the passage of the data packet 619, for example, to the firmware 603, and replies a successful return code 620. If the data packet 619 is not deemed digitally signed by an authorized entity, then the embedded logic 618 makes an additional check to see if the entry port is configured as read-write. If not, then the embedded logic 618 allows passage of the data packet 619, for example, to the firmware 603, and replies a successful return code 620. If the entry port is configured as read-write and the data packet 619 is not deemed digitally signed by an authorized entity, then the embedded logic 618 records a database event 621 in the storage disk 615 in the database events 616 area, then replies with an error return code 622, and drops the data packet 619.

In the firmware 603, the embedded logic 518 first checks the data packet 519 to determine if the data packet 519 is trying to write, or more generally, whether the data packet 519 contains an instruction of a known file-sharing protocol other than a reading instruction, which may be an instruction to create, insert data, delete, rename, update or write. If not, then the embedded logic 518 allows the passage of the data packet 519, for example, to the computer systems and networks 614, or allows the execution of a reading instruction on the customer database portion 727, and replies a successful return code 520. If the data packet 519 is trying to write or, more generally, contains an instruction other than a reading instruction, then the embedded logic 518 makes an additional check to see if the entry port is configured as read-write. If yes, then the embedded logic 518 allows passage of the data packet 519, for example, to the computer systems and networks 614, or allows the execution of a writing instruction or generally the execution of an instruction other than a reading instruction on the customer database portion 727, and then replies a successful return code 520. If the entry port is configured as read-only, then the embedded logic 518 records a database event 521 in the storage disk 615 in the database events 616 area, replies an error return code 522, drops the data packet 519. In some cases, for example, in order to gain additional reporting information, such as file names, file location, directory names, etc., or to stop the ability to download information requested from a reading instruction, the embedded logic 518 may alter the instruction in the data packet 519 and may allow passage of the data packet with altered functionality 519b, for example, to the computer systems and networks 614.

The database events 616 portion of the storage disk 615 contains the following information for each event, regardless of being recorded by the embedded logic 618 or 518: a unit identifier of the hardware unit 600, a sequentially generated event identifier, a client identifier of the customer, the current date, the current time, an error return code 622, an event type, a result which describes the action taken by the hardware unit 600, the directory of the file which sent the data packet 619, the source address of the URL which sent the data packet 619, the filename for the source which sent the data packet 619, the destination address of the data packet 619, the reporting URL where the database event 616 is to be reported, and other pertinent information for reporting which do not have specifically designated fields.

The hardware unit 600 has a reporting utility 623 which resides in the internal utilities 617 portion of the storage disk 615. The reporting utility 623 reads the system clock 624 periodically and then reads the database events 616 and electronically transmits the database events 616 that have not been previously reported to an external location. The hardware unit 600 electronically transmits reported database events through, for example, Port4 607 using WAN 611.

Back in reference to the example of FIG. 1, users can utilize the Internet or the LAN to read data generated or hosted by the computer systems and networks 614 or data hosted in the customer database portion 727. The hardware unit 600 protects the computer systems and networks 614 or the customer database portion 727 against cyber attacks via the interface 604 by blocking any attempt to write or, more generally, by blocking the execution of any instruction other than a reading instruction. However, authorized users can still write or, more generally, execute instructions other than a reading instruction of data hosted on the computer systems and networks 614 or data hosted in the customer database portion 727 by sending the instructions to the interface 605, which may have a private IP address, provided that the instructions are in a data packet 619 that reaches the interface 605 and is digitally signed.

In addition to the foregoing, the disclosure also contemplates at least the following embodiments. It should be noted that any element of any embodiments 1-23 may further include details related to this element that are disclosed in a paragraph or Figure describing the preferred embodiments without including details of other elements that are disclosed in the same or other paragraph or Figure.

Embodiment 1

Embodiment 1 is an apparatus for providing protection to a device connected to a public or private network. The apparatus comprises non-flashable circuitry mounted on a motherboard. The non-flashable circuitry may be located in an enclosure.

The motherboard is coupled to at least first, second, and third connections, which are either wired or wireless. The non-flashable circuitry is connectable to the public or private network via the first connection (e.g., a read-only connection) and the second connection (e.g., a read-write connection). The non-flashable circuitry is also connectable to the device via the third connection.

In order to implement a "read-only connection," the non-flashable circuitry is configured on the one hand to:
  receive first data packets or frames from the public or private network via the first connection;
  determine whether the first data packets or frames contain an instruction of a known file-sharing protocol other than a reading instruction;
  discard the first data packets or frames when the first data packets or frames contain the instruction other than the reading instruction; and
  transmit the first data packets or frames to the device via the third connection when the first data packets or frames are not discarded.

Optionally, the non-flashable circuitry may additionally be configured to:
  modify the first data packets or frames to create modified data packets or frames with altered functionality, such as by replacing the instruction in the first data packets or frames by another instruction; and
  transmit the modified data packets or frame with the altered functionality, for example, to gain additional reporting information, such as file names, file location, directory names, etc., or to stop the ability to download information requested from a reading instruction.

In order to implement a "read-write connection," the non-flashable circuitry is configured on the other hand to:
  receive second data packets or frames via the second connection;
  determine whether the second data packets or frames are digitally signed and originate from a source identified by a token stored in the non-flashable circuitry;
  discard the second data packets or frames when the second data packets or frames are not digitally signed by the source; and
  transmit the second data packets or frames to the device via the third connection when the data packets or frames originate from the source.

Determining whether the first data packets or frames contain the instruction other than the reading instruction may involve testing whether the data packets or frames contain any of an instruction to either create a file, insert data in a file, delete a file, update a file, rename a file, or write on a file. In some cases, all these tests are performed. However, more or fewer than all these tests could be performed.

Determining whether the second data packets or frames are digitally signed and originate from a source identified by a token stored in the non-flashable circuitry may involve any known or future-developed algorithm capable of providing a digital signature matching the token.

Embodiment 2

Embodiment 2 is an apparatus as described in embodiment 1, further comprising a storage medium that is coupled to the motherboard, and optionally located in the enclosure, if an enclosure is provided. The storage medium may be any storage medium, such as a disk, flash memory, or solid-state drive. The non-flashable circuitry is further configured to record a first database event on the storage medium when the first data packets or frames contain the instruction other than the reading instruction, wherein the first database event includes at least the source address of the universal resource locator ("URL") which sent the first data packet or frame containing the instruction other than the reading instruction.

Embodiment 3

Embodiment 3 is an apparatus as described in embodiment 1, wherein the storage medium specifically includes a disk.

Embodiment 4

Embodiment 4 is an apparatus as described in embodiments 2 or 3, wherein the non-flashable circuitry is further configured to periodically (e.g., based on an internal or external clock signal) inspect the storage medium for one or more newly recorded database events. The non-flashable circuitry is further configured to transmit the one or more newly recorded database events. In order to do so, the non-flashable circuitry may, for example, use the first or second connection to send data packets or frames to create or update a file on the public or private network, or use the third connection to send data packets or frames to create or update a file on the machine. Alternatively, the non-flashable circuitry may use another connection to create or update a file on a node connected to the other connection.

Embodiment 5

Embodiment 5 is an apparatus as described in any of embodiments 1 to 4 wherein the non-flashable circuitry is further configured so that one or both of the first connection and the second connection interface(s) directly with the Internet, such as with the use of forward facing to internet code.

Embodiment 6

Embodiment 6 is an apparatus as described in any of embodiments 1 to 5 wherein the third connection is connected to a database, documents or data files, encryption keys, or bitcoin keys.

Embodiment 7

Embodiment 7 is an apparatus as described in any of embodiments 1 to 6, wherein the non-flashable circuitry is further configured to decrypt the second data packets or frames via the second connection using a public key. Determining whether the second data packets or frames are digitally signed and originate from a source identified by a token stored in the non-flashable circuitry preferably involves decrypting the second data packets or frames via the second connection using the public key.

Embodiment 8

Embodiment 8 is an apparatus as described in any of embodiments 1 to 7 wherein at least one of the first, second, and third connections are wired connections.

Embodiment 9

Embodiment 9 is an apparatus as described in any of embodiments 1 to 8, wherein the non-flashable circuitry is further configured to receive third data packets or frames from the device via the third connection, and transmit the third data packets or frames to the public or private network via the first or second connection, or via a fourth connection provided coupled to the non-flashable circuitry, and optionally located in the enclosure, if an enclosure is provided.

Embodiment 10

Embodiment 10 is an apparatus as described in any of embodiments 1 to 9, wherein the first and second database events each specifically includes one or more of the following:
  an identifier of the apparatus,
  a sequentially generated event identifier,
  the client identifier of the customer,
  the current date,
  the current time,
  an error return code,
  an event type,
  data indicative of an action taken by the apparatus,
  a directory of the file which sent the data packet or frame containing the instruction other than the reading instruction,
  the source address of the URL which sent the data packet or frame containing the instruction other than the reading instruction,
  the filename for the source which sent the data packet or frame containing the instruction other than the reading instruction,
  the destination address of the data packet or frame containing the instruction other than the reading instruction, and/or
  a reporting URL where the database event is to be reported.

Embodiment 11

Embodiment 11 is a system comprising an apparatus as described in any of embodiments 1 to 10 and a Virtual Private Network ("VPN") server, wherein the second connection is connected to the VPN server via the public or private network.

Embodiment 12

Embodiment 12 is a system comprising an apparatus as described in any of embodiments 1 to 10 and a Programmable Logic Controller ("PLC") or a Remote Telemetry Unit ("RTU") of a Supervisory Control and Data Acquisition ("SCADA") system or a data server, or a file server. The third connection is connected to the Programmable Logic Controller, the Remote Telemetry Unit, the data server, or the file server.

Embodiment 13

Embodiment 13 is an apparatus for protecting a database from cyber attacks. The apparatus comprises a motherboard, which may be located in an enclosure, a storage medium that is coupled to the motherboard, and is optionally located in the enclosure, if one is provided, the storage medium including any storage medium, such as a disk, flash memory, or solid-state drive, the storage medium hosting the database, and non-flashable circuitry located in the enclosure.

The motherboard is coupled to at least a connection located in or on the enclosure, if one is provided, and preferably at least first and second connections, which are either wired or wireless. The non-flashable circuitry is connectable to a public or private network via the connection, and preferably via the first connection (e.g., a read-only connection) and the second connection (e.g., a read-write connection).

The non-flashable circuitry is configured to:
  receive data packets or frames from the public or private network via the connection, and optionally via the first and second connections;
  determine whether the data packets or frames (preferably the ones received via the first connection) contain a reading instruction of a known file-sharing protocol and whether the data packets or frames are addressed to the storage medium;
  execute the reading instruction when the data packets or frames (preferably the ones received via the first connection) contain the reading instruction and the data packets or frames are addressed to the storage medium.
  determine whether the data packets or frames (preferably the ones received via the second connection) are digitally signed by a source identified by a token stored in the non-flashable circuitry and whether the data packets or frames are addressed to the storage medium;
  execute instructions contained in the data packets or frames (preferably the ones received via the second connection), including instructions other than a reading instruction, when the data packets or frames are digitally signed, and the data packets or frames are addressed to the storage medium;
  determine whether the data packets or frames contain an instruction of the known file-sharing protocol other than the reading instruction, the data packets or frames are not digitally signed by the source, and the data packets or frames are addressed to the storage medium; and
  discard the data packets or frames when the data packets or frames contain the instruction other than the reading instruction, the data packets or frames are not digitally signed by the source, and the data packets or frames are addressed to the storage medium.

Optionally, the non-flashable circuitry may additionally be configured to:
  modify the data packets or frames to create modified data packets or frames with altered functionality, such as by replacing the instruction in the data packets or frames by another instruction; and
  transmit the modified data packets or frames with the altered functionality, for example, in order to gain additional reporting information, such as file names, file location, directory names, etc., or to stop the ability to download information requested from a reading instruction.

Determining whether the data packets or frames contain the instruction other than the reading instruction may involve testing whether the data packets or frames contain any of an instruction to either create a file, insert data in a file, delete a file, update a file, rename a file, or write on a file. In some cases, all these tests are performed. However, more or fewer than all these tests could be performed.

Determining whether the data packets or frames are digitally signed and originate from a source identified by a token stored in the non-flashable circuitry may involve any known or future-developed algorithm capable of providing a digital signature matching the token.

Determining whether the data packets or frames are addressed to the storage medium may involve testing whether the data packets or frames are destined to a specific IP (static) address assigned to the storage medium.

Embodiment 14

Embodiment 14 is an apparatus as described in embodiment 13, wherein the non-flashable circuitry is further configured to record a database event on the storage medium when the data packets or frames contain the instruction other than the reading instruction, the data packets or frames are not digitally signed by the source, and the data packets or frames are addressed to the storage medium, wherein the database event includes at least the source address of the URL which sent the data packet or frames containing the instruction other than the reading instruction, not being digitally signed, and being addressed to the storage medium.

Embodiment 15

Embodiment 15 is an apparatus as described in embodiments 13 or 14, wherein the non-flashable circuitry is further configured to decrypt the data packets or frames (preferably the ones received via the second connection) when the data packets or frames contain the reading instruction and the data packets or frames are addressed to the storage medium. The decryption may involve a public key, which may also be used as the token identifying the source.

Embodiment 16

Embodiment 16 is an apparatus as described in any of embodiments 13 to 15, wherein another connection is optionally provided on the enclosure if one is provided, and is connected to the non-flashable circuitry. The non-flashable circuitry is further configured to transmit the data packets or frames via the other connection when the data packet or frames are not addressed to the storage medium.

Embodiment 17

Embodiment 17 is an apparatus as described in any of embodiments 13 to 16, wherein the connection (and optionally at least one of the first and second connections) is(are) specifically wired.

Embodiment 18

Embodiment 18 is an apparatus as described in any of embodiments 13 to 17 wherein the non-flashable circuitry is further configured so that one or both of the first connection and the second connection interface(s) directly with the Internet, such as with the use of forward facing to internet code.

Embodiment 19

Embodiment 19 is an apparatus as described in any of embodiments 14 to 18, wherein the non-flashable circuitry is further configured to periodically (e.g., based on an internal or external clock signal) inspect the storage medium for one or more newly recorded database events. The non-flashable circuitry is further configured to transmit the one or more newly recorded database events. In order to do so, the non-flashable circuitry may, for example, use the connection (or optionally the first or second connection) to send data packets or frames to create or update a file on the public or private network, or alternatively, use another connection to create or update a file on a node connected to the other connection.

Embodiment 20

Embodiment 20 is an apparatus as described in any of embodiments 14 to 19, wherein the database events each specifically includes one or more of the following:
 an identifier of the apparatus,
 a sequentially generated event identifier,
 the client identifier of the customer,
 the current date,
 the current time,
 an error return code,
 an event type,
 data indicative of an action taken by the apparatus,
 a directory of the file which sent the data packet or frame containing the instruction other than the reading instruction,
 the source address of the URL which sent the data packet or frame containing the instruction other than the reading instruction,
 the filename for the source which sent the data packet or frame containing the instruction other than the reading instruction,
 the destination address of the data packet or frame containing the instruction other than the reading instruction, and/or
 a reporting URL where the database event is to be reported.

Embodiment 21

Embodiment 21 is an apparatus as described in any of embodiments 13 to 20, wherein the database hosted on the storage medium is at least partially encrypted using a public key, which may be used as the token identifying the source. As such, even if the storage medium is physically accessed by an unauthorized user, data in the database hosted on the storage medium may remain indecipherable by the unauthorized user.

Embodiment 22

Embodiment 22 is a method of providing protection to a device or a database connected to a public or private network. The method comprises the step of providing an apparatus as described in any of embodiments 1 to 21. The method comprises using the apparatus to perform the following steps:
 receiving data packets or frames from the public or private network;
 either transmitting the data packets or frames when the data packets or frames contain a reading instruction or executing reading instructions contained in the data packets or frames;
 either transmitting the data packets or frames when the data packets or frames are digitally signed by the source or executing instructions contained in the data packets or frames when the data packets or frames are digitally signed by the source; and discarding the data packets or frames when the data packets or frames are not digitally signed by the source and contain an instruction other than a reading instruction.

Optionally, the method may further comprise the steps of:

modifying the data packets or frames to create modified data packets or frames with altered functionality, such as by replacing the instruction in the data packets or frames by another instruction; and either transmitting the modified data packets or frames or executing the instructions in the modified data packets or frames.

Embodiment 23

Embodiment 23 is a method as described in embodiment 22, further comprising recording a database event if the data packets or frames contain the instruction other than the reading instruction and are not digitally signed by the source.

Specific embodiments of the invention are shown by way of examples in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. An apparatus for providing protection to a device connected to a public or private network, comprising:
   a motherboard coupled to first, second, and third connections;
   non-flashable circuitry mounted on the motherboard, wherein the non-flashable circuitry is connectable to the public or private network via the first and second connections and the non-flashable circuitry is connectable to the device via the third connection, and wherein the non-flashable circuitry is configured to:
   receive first data packets or frames from the public or private network via the first connection;
   determine whether the first data packets or frames contain an instruction of a known file-sharing protocol other than a reading instruction;
   discard the first data packets or frames when the first data packets or frames contain the instruction other than the reading instruction;
   transmit the first data packets or frames to the device via the third connection when the first data packets or frames are not discarded;
   receive second data packets or frames via the second connection;
   determine whether the second data packets or frames are digitally signed and originate from a source identified by a token stored in the non-flashable circuitry;
   discard the second data packets or frames when the second data packets or frames are not digitally signed or do not originate from the source; and
   transmit the second data packets or frames to the device via the third connection when the data packets or frames originate from the source.

2. The apparatus of claim 1, wherein the non-flashable circuitry is further configured to modify the data packets or frames, to create modified data packets or frames with altered functionality, and to transmit the modified data packets or frames.

3. The apparatus of claim 2 further comprising a storage medium that is coupled to the motherboard, wherein the non-flashable circuitry is further configured to record a first database event on the storage medium when the first data packets or frames contain the instruction other than the reading instruction, wherein the first database event includes a source address of a URL which sent the first data packet or frame containing the instruction other than the reading instruction.

4. The apparatus of claim 2, wherein:
   the non-flashable circuitry is further configured to periodically inspect the storage medium for one or more newly recorded database events; and
   the non-flashable circuitry is further configured to transmit the one or more newly recorded database events.

5. The apparatus of claim 2, wherein the non-flashable circuitry is further configured so that one or both of the first connection and the second connection interface(s) directly with Internet.

6. The apparatus of claim 2, wherein the second connection is connected to a Virtual Private Network server.

7. The apparatus of claim 2, wherein the third connection is connected to a Programmable Logic Controller or a Remote Telemetry Unit of a Supervisory Control and Data Acquisition system or a data server, a database, a file server, documents or data files, encryption keys, bitcoin keys.

8. The apparatus of claim 2, wherein the non-flashable circuitry is further configured to decrypt the second data packets or frames via the second connection using a public key.

9. The apparatus of claim 2, wherein the first, second, and third connections are wired connections.

10. The apparatus of claim 2, wherein the non-flashable circuitry is further configured to receive third data packets or frames from the device via the third connection, and transmit the third data packets or frames to the public or private network via the first or second connection, or via a fourth connection coupled to the motherboard.

11. The apparatus of claim 2, wherein the first and second database events each includes an identifier of the apparatus, a sequentially generated event identifier, a client identifier of a customer, a current date, a current time, an error return code, an event type, data indicative of an action taken by the apparatus, a directory of the file which sent the data packet or frame containing the instruction other than the reading instruction, the source address of the URL which sent the data packet or frame containing the instruction other than the reading instruction, a filename for the source which sent the data packet or frame containing the instruction other than the reading instruction, a destination address of the data packet or frame containing the instruction other than the reading instruction, a reporting URL where the database event is to be reported.

12. An apparatus for protecting a database from cyber attacks, comprising:
    a motherboard coupled to a connection;
    a storage medium that is coupled to the motherboard, the storage medium hosting the database;
    non-flashable circuitry mounted on the motherboard, wherein the non-flashable circuitry is connectable to a public or private network via the connection and wherein the non-flashable circuitry is configured to:
    receive data packets or frames from the public or private network via the connection;

determine whether the data packets or frames contain a reading instruction of a known file-sharing protocol and whether the data packets or frames are addressed to the storage medium;

execute the reading instruction when the data packets or frames contain the reading instruction and the data packets or frames are addressed to the storage medium;

determine whether the data packets or frames are digitally signed by a source identified by a token stored in the non-flashable circuitry and whether the data packets or frames are addressed to the storage medium;

execute the instructions contained in the data packets or frames when the data packets or frames are digitally signed, and the data packets or frames are addressed to the storage medium;

determine whether the data packets or frames contain an instruction of the known file-sharing protocol other than the reading instruction, the data packets or frames are not digitally signed by the source, and the data packets or frames are addressed to the storage medium; and discard the data packets or frames when the data packets or frames contain the instruction other than the reading instruction, the data packets or frames are not digitally signed by the source, and the data packets or frames are addressed to the storage medium.

13. The apparatus of claim 12, wherein the non-flashable circuitry is further configured to modify the data packets or frames to create modified data packets or frames with altered functionality, and to execute the modified data packets or frames.

14. The apparatus of claim 13, wherein the non-flashable circuitry is further configured to decrypt the data packets or frames when the data packets or frames contain the reading instruction and the data packets or frames are addressed to the storage medium.

15. The apparatus of claim 13, wherein:

another connection is coupled to the motherboard and is connected to the non-flashable circuitry; and the non-flashable circuitry is further configured to transmit the data packets or frames via the other connection when the data packet or frames are not addressed to the storage medium.

16. The apparatus of claim 13 wherein the non-flashable circuitry is further configured to record a database event on the storage medium when the data packets or frames contain the instruction other than the reading instruction, the data packets or frames are not digitally signed by the source and the data packets or frames are addressed to the storage medium, wherein the database event includes the source address of a URL which sent the data packet or frames containing the instruction other than the reading instruction, not being digitally signed, and being addressed to the storage medium.

17. The apparatus of claim 13, wherein the non-flashable circuitry is further configured so that the connection interfaces directly with Internet.

18. The apparatus of claim 13, wherein:

the non-flashable circuitry is further configured to periodically inspect the storage medium for one or more newly recorded database events; and the non-flashable circuitry is further configured to transmit the one or more newly recorded database events.

19. The apparatus of claim 13, wherein the database event includes an identifier of the apparatus, a sequentially generated event identifier, a client identifier of a customer, a current date, a current time, an error return code, an event type, data indicative of an action taken by the apparatus, a directory of the file which sent the data packet or frame containing the instruction other than the reading instruction, the source address of the URL which sent the data packet or frame containing the instruction other than the reading instruction, the filename for the source which sent the data packet or frame containing the instruction other than the reading instruction, the destination address of the data packet or frame containing the instruction other than the reading instruction, a reporting URL where the database event is to be reported.

20. The apparatus of claim 13, wherein the database hosted on the storage medium is encrypted.

* * * * *